United States Patent [19]

Marchetti et al.

[11] 4,118,247

[45] Oct. 3, 1978

[54] SUSPENSIONS OF REACTIVE ACIDIC CLAY PIGMENTS

[75] Inventors: Francis R. Marchetti, Skillman; William E. Zentz, Iselin; Richard R. Berube, Keyport, all of N.J.

[73] Assignee: Engelhard Minerals & Chemicals Corporation, Edison, N.J.

[21] Appl. No.: 838,567

[22] Filed: Oct. 3, 1977

[51] Int. Cl.² .................................................. C09C 1/42
[52] U.S. Cl. .................................. 106/308 N; 106/72; 106/288 B; 106/288 Q; 428/331; 427/146
[58] Field of Search ............... 106/72, 288 B, 288 Q, 106/308 N; 428/331; 427/146

[56] References Cited

U.S. PATENT DOCUMENTS

| | | | |
|---|---|---|---|
| 3,989,278 | 11/1976 | Lorok et al. | 106/288 B |
| 4,017,324 | 4/1977 | Eggers | 106/288 B |
| 4,022,735 | 5/1977 | Thompson | 106/288 B |
| 4,042,412 | 8/1977 | Williams | 106/288 B |

*Primary Examiner*—Winston A. Douglas
*Assistant Examiner*—J. V. Howard
*Attorney, Agent, or Firm*—Inez L. Moselle

[57] ABSTRACT

AMP (2-amino, 2-methyl, 1-propanol) or a related amino hydroxy compound is used with a sodium condensed phosphate dispersant in the preparation of stable aqueous suspensions of acidic, acid-treated montmorillonite clay pigment particles. The suspensions are used in the manufacture of carbonless copying paper.

12 Claims, No Drawings

SUSPENSIONS OF REACTIVE ACIDIC CLAY PIGMENTS

BACKGROUND OF THE INVENTION

This invention relates to the art of preparing stable aqueous suspensions of reactive pigments obtained by the acid treatment of montmorillonite clay. Such suspensions are adapted for use in the manufacture of coated paper which is used as receiving members of so-called "carbonless coating paper" such as described in U.S. Pat. No. 3,963,852 to Baxter.

Acid-treated reactive montmorillonite pigments are acidic pigments used commercially in the production of carbonless copying paper. The Baxter patent teaches that acid treatment improves the rheological properties of aqueous suspensions of montmorillonite-type clay whereby the treated clay is more amenable to application to paper by present-day paper coating technology. Acid treatment also confers desirable imaging properties when certain dye precursors are used in the manufacture of the record material. Nevertheless such pigments present problems not encountered in the handling of the more familiar coating clay (hydrous kaolin clay). Hydrous kaolins of suitable grade can be made down into fluid high solids suspensions, typically containing about 70% solids. Condensed phosphate salts such as tetrasodium pyrophosphates or Calgon ® are employed as dispersants. These suspensions are mixed with suspensions of adhesives such as latex or starch to form concentrated (for example, 60% solids) suspensions, known as "coating colors." The colors are dried and coated on paper. The rheology of kaolin colors is such that high speed coating machinery, for example blade coaters, can be employed. It is not possible using presently known methods to produce flowable 70% solids dispersed slurries of acid-treated montmorillonite pigments. In fact, some dispersed suspensions containing more than 40% acid-treated clay solids and prepared with the conventional dispersants tend to set up into heavy gels which cannot be used to produce coating colors. Somewhat higher solids suspensions can be produced by using a mixture of a major amount of acid-treated montmorillonite with calcined kaolin clay but these suspensions tend to be dilatant. In other words, the suspensions thicken as shear rate is increased. In some cases a fluid suspension can become so viscous that the blades of the mixing equipment are broken. Dilatancy results in difficulties in pumping as well as mixing and application to paper.

Conventional aqueous suspensions of acid-treated montmorillonite carbonless pigments have acidic pH values. When conventional (phosphate) dispersants are used to prepare high solids suspensions, the pH of the suspensions is slightly acidic. The pH must be increased to about 6.5 or above before makedown into a coating color. Ammonia is conventionally used and this frequently results in severe "shock" — the transformation of a fluid system into a useless solid or semisolid mass.

Alkanolamines such as AMP have been suggested for use as possible dispersants in the production of high solids (60 to 70%) slurries of calcined kaolin clay. Reference is made to U.S. Pat. No. 4,017,324 to Eggers. The calcined clay must be used with a lesser amount of conventional hydrated kaolin clay. According to the teachings of the patent, the alkanolamine or other dispersant is employed in amount of 0.2 to 2% of the total slurry weight.

THE INVENTION

In accordance with this invention, a stabilized aqueous suspension of an acid-treated montmorillonite pigment with improved rheological properties is prepared by using as the dispersant a sodium condensed phosphate salt such as tetrasodium pyrophosphate or sodium hexametaphosphate and incorporating a small amount of an alkanolamine selected from the group consisting of 2-amino-2-methyl-1-propanol (AMP), tris(hydroxymethyl)aminomethane (TRIS AMINO ®), or 2-amino-2-ethyl-1,3-propanediol (AEPD ®).

In a preferred embodiment of the invention, the slurries also contain particles of a calcined kaolin clay pigment as a diluent or extender.

The slurries of the invention are prepared by dissolving in the water employed in the slurry formation a condensed phosphate in dispersant-effective amount, adding the aminoalcohol and gradually incorporating, with mixing, particles of acidic montmorillonite clay pigment. Optionally the slurries contain calcined kaolin clay which may be present in major or minor amount.

AMP, when used together with a condensed phosphate, has been found to be an effective and unique adjunct to a dispersant for commercial acid-treated montmorillonite pigments and for mixtures of such pigments with calcined kaolin diluent or extender. The combination of phosphate dispersant and AMP provides faster pigment "wet out" during slurry makedown and results in lower viscosity slurries with good storage stability. Thus, when the combination of condensed phosphate and aminoalcohol is used to prepare a high solids, e.g., 38 to 40% solids, slurry of an acid-treated montmorillonite, the suspension has an acceptable viscosity (Brookfield). When the suspension is allowed to age, a gel does form but the structure is soft and readily broken up by a low-speed agitator. Practice of the invention permits the formulation of suspensions of extended pigment at higher solids, up to 53%, having acceptable viscosity and good storage stability; dilatancy is reduced.

An important advantage of the suspensions of the invention over those prepared with conventional dispersants, or AMP alone, is that suspensions of the invention do not undergo severe shock when ammonia is added to adjust pH during preparation of coating colors. Furthermore, carbonless record material prepared with the slurries shows superior fade resistance after imaging with nonlactone dyes of the type disclosed in the Baxter patent.

PREFERRED EMBODIMENTS

Using an acidic acid-treated montmorillonite carbonless copying pigment as the sole pigment, the phosphate dispersant is first added to water in amount within the range of about 3 to 8%, most generally about 5%, based on the dry weight of the pigment, followed by addition of AMP (or equivalent alkanolamine) in amount within the range of about 0.5 to 3%, usually 2% of the dry pigment weight. Pigment is added gradually in amount sufficient to prepare a 30 to 40% solids slurry. Conventional makedown procedures and equipment can be used. A smaller amount of condensed phosphate is required when the acidic clay is extended with calcined kaolin clay and higher solids suspensions can be produced.

The proportion of calcined kaolin to acid-treated montmorillonite is in the range of about 10 to 80 parts by weight calcined clay to 90 to 10 parts by weight acid-treated montmorillonite. Preferably we use 50 to 80 parts by weight calcined clay to 50 to 20 parts by weight acid-treated montmorillonite. Especially preferred is the use of approximately 65 to 75 parts by weight calcined clay to 35 to 25 parts acid-treated clay. As the proportion of calcined kaolin is increased, the amount of phosphate dispersant will decrease and the solids level of the slurry may be increased to an amount in the range of about 50 to 55%. Thus, the phosphate dispersant is used in amount of about 0.5% up to about 5% when extended acid-treated montmorillonite is used in the formulation. The same quantity of amino-alcohol, typically 2% AMP based on the dry pigment weight, is employed. When AMP is not present, it is not possible to prepare slurries of such concentrations.

Acid-treated montmorillonite pigments used in practice of this invention are known in the art. Reference is made to the following patents: U.S. Pat. No. 3,963,852 to Baxter and U.S. Pat. No. 3,633,364 to Sugahara et al. Such carbonless copying paper pigments are produced by leaching a dioctahedral montmorillonite clay with an acid, usually sulfuric acid, followed by washing, grinding and particle size classification. Optionally, the material is calcined after heat treatment.

Calcined clay paper coating pigments are known in the art and are commercially available as products such as SATINTONE ® SPECIAL and ANSILEX ®.

Commercial acid-treated montmorillonite pigments supplied for use in carbonless copying paper are distinctly acidic. The pH varies, of course, with residual free acidity and is generally in the range of 3 to 5. Commercial calcined kaolin clay pigments have pH values in the range of about 4 to 5. A typical mixture of such pigments has a pH in the range of 3 to 5. All pH values refer to values obtained by the TAPPI procedure using 20 grams pigment and 80 grams distilled water.

The following examples are given for illustrative purposes. In the examples all proportions are on a weight basis, the weight of all pigments being expressed on a dry weight basis.

EXAMPLE I

PIGMENT MAKEDOWN

A 38.1% solids suspension of an acid-treated montmorillonite carbonless pigment (pH of 3.1) was prepared in accordance with this invention as follows. CALGON ® dispersant was dissolved in water, following which AMP (95% active) was added. Acid-treated montmorillonite pigment was gradually added with stirring, using a conventional makedown procedure similar to that used in commercial practice. The slurry contained 5% CALGON and 2% AMP, each based on the weight of the pigment. The resulting slurry (pH 5.2) contained 38.1% solids. Brookfield viscosity (#4 spindle) was 150 cp. at 20 r.p.m. and 180 cp. at 100 r.p.m. Hercules (high shear) viscosity was 4.6 dynes/1100 r.p.m. These values are considered to be within the desirable range for coating color manufacture. After storage for a month the slurry set into a soft gel which was readily broken up by mild stirring, producing a fluid slurry having rheology similar to that of the fresh slurry.

In a control test, a slurry of the same pigment was prepared at the same solids, using the same quantity of CALGON but omitting the AMP. The viscosity of the fresh slurry was similar to that of the slurry of the invention. However, when stored for several weeks the slurry set into a hard gel which could not be dispersed.

COATING COLOR PREPARATION

Ammonia was added to a portion of the slurry of the invention to increase pH to 7.5, as required for coating color preparation. Brookfield viscosity was 500 cp. at 20 r.p.m. and 200 cp. at 100 r.p.m., indicating that some thickening took place but that the slurry was sufficiently fluid for use. When ammonia was added to a sample of freshly prepared control slurry (no AMP), severe shock occurred.

A typical 40% solids latex coating color was produced from the pigment slurry of the invention by mixing with Dow 620 latex, using 12 parts latex to 100 parts pigment. Brookfield viscosity of the slurry was 500 rp. at 20 r.p.m. and 180 cp. at 100 r.p.m. Hercules (high shear viscosity) was satisfactory.

The resulting coating color was coated on paper and used successfully to develop images by contact with commercial sheets coated with an encapsulated solution of a proprietary nonlactone dye precursor.

EXAMPLE II

The procedure of the previous example was repeated with a mixture of 30 parts by weight acid-treated montmorillonite pigment and 70 parts by weight AN-SILEX ® calcined clay.

Using 1% CALGON and 2% AMP, based on the total pigment weight, a slurry containing 52.4% solids was produced (pH 7.7). Brookfield viscosity was 350 cp. at 20 r.p.m. and 150 cp. at 100 r.p.m. Hercules viscosity was 825/16 (dynes/r.p.m.).

In a control test, AMP was omitted, resulting in a 50.6% solids slurry having a high Brookfield viscosity (1600 cp. at 20 r.p.m. and 800 cp. at 100 r.p.m.). This slurry was quite dilatant, as evidenced by the fact that Hercules viscosity was 340/16 (dynes/r.p.m.).

In making up coating colors with the control slurry formulated without AMP, it was necessary to adjust pH to 7.5 with ammonia, resulting in distinct shock (Brookfield viscosity of 27,500 cp. at 20 r.p.m.). No ammonia was needed when using the slurry of the invention; this slurry was prepared into a 52.1% solids coating color with Dow 620 latex containing 12 parts latex per 100 parts by weight total pigment. Viscosity of the color was 250 cp. at 20 r.p.m. and 120 cp. at 100 r.p.m. The color was coated on paper and found to produce satisfactory imaging in carbonless paper using the commercial dye-transfer sheets. In contrast, the slurry without AMP produced a coating color which was highly viscous at only 50.5% solids. Thus, Brookfield viscosity was 5500 cp. at 20 r.p.m. and 1700 cp. at 100 r.p.m.

While the invention has been described in terms of preferred embodiments, the claims appended hereto are intended to encompass all embodiments which fall within the spirit of the invention.

We claim:

1. An aqueous slurry of acid-treated montmorillonite pigment adapted for use in carbonless copying paper containing a dispersant-effective amount of a sodium condensed phosphate salt and from about 0.5 to 5% by weight of said pigment of an alkanolamine selected from the group consisting of 2-amino-2-methyl-1-propanol, tris(hydroxymethyl)-aminomethane and 2-amino-2-ethyl-1,3 propanediol.

2. The slurry of claim 1 wherein said alkanolamine is 2-amino-2-methyl-1-propanol.

3. The slurry of claim 2 wherein said acid-treated montmorillonite is the sole pigment in said slurry and said slurry has a pigment solids content in the range of about 38 to 40% by weight.

4. The slurry of claim 1 which also contains calcined kaolin clay.

5. The slurry of claim 1 which also contains calcined kaolin clay in a major amount relative to the weight of said acid-treated montmorillonite clay pigment, said slurry having a total clay solids content in the range of about 50 to 53% by weight.

6. The slurry of claim 4 wherein said calcined kaolin clay is present in amount in the range of 10 to 80 parts by weight to 90 to 10 parts by weight of acid-treated montmorillonite.

7. The slurry of claim 4 wherein said calcined kaolin clay is present in amount in the range of 50 to 80 parts by weight to 50 to 20 parts by weight of acid-treated montmorillonite.

8. The slurry of claim 4 wherein said calcined kaolin clay is present in amount in the range of 65 to 75 parts by weight to 35 to 25 parts by weight of acid-treated montmorillonite.

9. In the production of carbonless copying paper utilizing an aqueous coating color containing acid-treated montmorillonite as the reactive coating pigment, the improvement which comprises preparing said coating color by adding said pigment to water containing a dispersant effective amount of a sodium condensed phosphate salt and from 0.5 to 5% by weight of said pigment of an alkanolamine selected from the group consisting of 2-amino-2-methyl-1-propanol, tris(hydroxymethyl)aminomethane and 2-amino-2-ethyl-1,3 propanediol and mixing an adhesive with the resulting slurry.

10. The method of claim 9 wherein said alkanolamine is 2-amino-2-methyl-1-propanol.

11. The method of claim 9 wherein said acid-treated montmorillonite is the sole pigment in said slurry and said slurry has a pigment solids content in the range of about 38 to 40% by weight.

12. The method of claim 9 wherein calcined kaolin clay is also incorporated into said slurry and in a major amount relative to the weight of said acid-treated montmorillonite clay pigment, the resulting slurry having a total clay solids content in the range of about 50 to 53% by weight.

* * * * *